(12) United States Patent
Noh et al.

(10) Patent No.: US 8,666,987 B2
(45) Date of Patent: Mar. 4, 2014

(54) APPARATUS AND METHOD FOR PROCESSING DOCUMENTS TO EXTRACT EXPRESSIONS AND DESCRIPTIONS

(75) Inventors: Hyung Jong Noh, Incheon-si (KR); Jong Hoon Lee, Daegu-si (KR); Sung Jin Lee, Pohang-si (KR); Gary Geunbae Lee, Pohang-si (KR)

(73) Assignee: Postech Academy—Industry Foundation, Pohang-Si, Gyeongsangbuk-Do (KR)

( * ) Notice: Subject to any disclaimer, the term of this patent is extended or adjusted under 35 U.S.C. 154(b) by 0 days.

(21) Appl. No.: 13/498,322

(22) PCT Filed: Oct. 11, 2010

(86) PCT No.: PCT/KR2010/006943
§ 371 (c)(1),
(2), (4) Date: Mar. 26, 2012

(87) PCT Pub. No.: WO2011/049313
PCT Pub. Date: Apr. 28, 2011

(65) Prior Publication Data
US 2012/0197894 A1    Aug. 2, 2012

(30) Foreign Application Priority Data
Oct. 23, 2009  (KR) .......................... 10-2009-0100962

(51) Int. Cl.
*G06F 7/00* (2006.01)
*G06F 17/30* (2006.01)

(52) U.S. Cl.
USPC ........... 707/737; 707/791; 707/793; 707/802; 707/803; 704/1; 704/2; 704/4; 704/7; 704/9

(58) Field of Classification Search
USPC .............. 707/737, 791, 793, 802, 803, 999.1; 704/1, 2, 4, 7, 9, 10
See application file for complete search history.

(56) References Cited

U.S. PATENT DOCUMENTS 6,658,627 B1 * 12/2003 Gallup et al. ................. 715/236
7,937,386 B2 * 5/2011 Barrett et al. ................. 707/713
(Continued)

FOREIGN PATENT DOCUMENTS

| CN | 1928862 | 3/2007 |
| CN | 101233484 | 7/2008 |

(Continued)

OTHER PUBLICATIONS

PCT International Search Report of PCT/KR2010/006943 dated May 20, 2011.

(Continued)

*Primary Examiner* — Hares Jami
(74) *Attorney, Agent, or Firm* — Kile Park Reed & Houtteman PLLC

(57) ABSTRACT

Disclosed is an apparatus and method for processing documents to extract expressions and descriptions. The apparatus for processing documents includes a document collection unit, which collects documents from websites and divides each of the collected documents into a script portion and a description portion to thus generate a script document and a description document, and an expression extraction unit, which extracts expression description sentences on the basis of the description document, and extracts expressions described by the expression description sentences from the script document. According to the invention, study material, including a pair that comprises an expression to be studied and a description thereof, can be automatically constructed.

21 Claims, 3 Drawing Sheets

(56) References Cited

U.S. PATENT DOCUMENTS

| | | | |
|---|---|---|---|
| 8,265,925 B2* | 9/2012 | Aarskog | 704/9 |
| 2006/0074980 A1 | 4/2006 | Sarlar | |
| 2007/0255553 A1* | 11/2007 | Nomoto | 704/9 |
| 2008/0004862 A1* | 1/2008 | Barnes et al. | 704/4 |
| 2008/0195378 A1* | 8/2008 | Nakazawa et al. | 704/9 |
| 2008/0249764 A1* | 10/2008 | Huang et al. | 704/9 |
| 2009/0019362 A1* | 1/2009 | Shprigel et al. | 715/256 |
| 2009/0327210 A1* | 12/2009 | Liu | 707/1 |
| 2010/0063797 A1* | 3/2010 | Cong et al. | 704/9 |

FOREIGN PATENT DOCUMENTS

| | | |
|---|---|---|
| CN | 101441636 | 5/2009 |
| JP | 2003-85181 | 3/2003 |
| JP | 2007-286355 A | 11/2007 |
| JP | 2009-157643 A | 7/2009 |
| KR | 10-2008-0037323 A | 4/2008 |
| KR | 10-2009-0035346 A | 4/2009 |

OTHER PUBLICATIONS

PCT Written Opinion of the International Searching Authority for PCT/KR2010/006943 dated May 20, 2011.

Yu Sakurai et al., "Automatic Generation of Term Explanation from the World Wide Web", Transactions of Information Processing Society of Japan; vol. 43, No. 5, May 2002; pp. 1470-1481.

Akiomi Nishida et al., "Extraction of description about person by two-staged refinement using machine larning", The Institute of Electronics, Information and Communication Engineers (IEICE) and Information Processing Society of Japan; vol. 108, No. 141, Jul. 10, 2008.

* cited by examiner

FIG.2

COMPLETE TRANSCRIPT

Welcome to English as a Second Language Podcast number 166,"A Marriage Proposal (Part I)." — DC

..........................

<start of story>

..........................
I've been trying to get up the nerve to ask my girlfriend to marry me. We have been dating for almost a year, and I think she's the one. I went shopping for engagement rings and really hated the experience.
.......................... — SP <end of story>

..........................
Well, the man in this story says that he's been trying "to get up the nerve" to ask my girlfriend – his girlfriend...not my girlfriend! Better be careful...to ask his girlfriend to marry him. The expression, "to get up the nerve" <u>means to</u> get the confidence, to be confident. If you are scared about something or you don't want to do something, you may need to get up your nerve; that means you need to say to yourself, "Okay, I'm ready" and not be afraid, not be scared to have confidence. Well, he's trying to get up the nerve to ask the girlfriend to marry him, to be his wife. — DP

APPARATUS AND METHOD FOR PROCESSING DOCUMENTS TO EXTRACT EXPRESSIONS AND DESCRIPTIONS

BACKGROUND OF THE INVENTION

1. Field of the Invention

The present invention relates to an apparatus and method for processing documents to extract expressions and descriptions, and more particularly, to an apparatus and method for processing documents to extract expressions and descriptions that collects documents from websites and extracts expressions and descriptions from the collected documents.

2. Description of the Related Art

A variety of methods for teaching English, the importance of which is continuously emphasized, have been developed. However, most existing English teaching methods mainly focus on problem-solving and memorization, and emphasize reading and writing. As one of the methods for overcoming the limitations of such English teaching methods, a dialogue system using English has been developed and used. The dialogue system may guide English learners to naturally learn a variety of expressions that are required in real life through a dialogue between the English learners and the system.

However, when they are not familiar with English expressions, such as words, phrases, and the like, which are presented by the system during a conversation, learners may wish to check the descriptions of the English expressions. In this case, the learners usually check the descriptions of the English expressions using an English dictionary. However, even though the descriptions of the English expressions are presented in an English dictionary or the like, the descriptions of the English expressions are mainly presented in a theoretical manner for English beginners, and the English expressions are described in Korean, so that there is a limitation to the accuracy with which the meaning is conveyed.

SUMMARY OF THE INVENTION

Accordingly, the present invention has been made in an effort to solve the problems occurring in the related art, and an object of the present invention is to provide an apparatus and method for processing documents, in which study material that includes a pair, comprising an expression to be studied and a description thereof, may be automatically constructed.

In order to achieve the above object, according to one aspect of the present invention, there is provided an apparatus for processing documents, including: a document collection unit, which collects documents from websites and divides each of the collected documents into a script portion and a description portion to generate a script document and a description document; and an expression extraction unit, which extracts expression description sentences on a basis of the description document, and extracts expressions described by the expression description sentences in the script document.

The apparatus for processing documents may further include a sentence extraction unit, which separates sentences from the script document to extract a plurality of script sentences, and separates sentences from the description document to extract a plurality of description sentences.

The sentence extraction unit may classify the description sentences to determine which of the script sentences each of the description sentences corresponds to.

The sentence extraction unit may classify the description sentences using a conditional random field classifier.

The expression extraction unit may extract the expression description sentence from among the plurality of description sentences using a labeled sequential pattern method.

The expression extraction unit may measure the degree of similarity between the expressions in the expression description sentences and the script sentences to extract the expressions described by the expression description sentence in the script sentence.

The degree of similarity may be measured using a cosine similarity method or an edit distance method.

The document collection unit may generate the script document and the description document on the basis of an identifier for identifying the beginning and end of each of the script portion and the description portion or sentences.

The apparatus for processing documents may further include a database for storing the extracted expressions and the expression description sentences that describe the extracted expressions.

The apparatus for processing documents may further include a material providing unit that provides, to a user, the extracted expressions and the expression description sentences, which describe the extracted expressions, in response to a request from the user.

The document may be written in English.

According to another aspect of the present invention, there is provided a language education system including any one of the apparatuses described above.

According to another aspect of the present invention, there is provided a method for processing documents, including: collecting documents from websites, and dividing each of the collected documents into a script portion and a description portion to generate a script document and a description document; and extracting expression description sentences from the description document, and extracting expressions described by the expression description sentences from the script document.

The method for processing documents may further include separating sentences from the script document to extract a plurality of script sentences, and separating sentences from the description document to extract a plurality of description sentences.

The extracting of the sentences may include classifying the description sentences to determine which of the plurality of script sentences each of the description sentences corresponds to.

The classifying of the description sentences may classify the description sentences using a conditional random field classifier.

The extracting of the expressions may include extracting the expression description sentences from the plurality of description sentences using a labeled sequential pattern method.

The extracting of the expressions may include measuring the degree of similarity between the expressions in the expression description sentences and the script sentences to extract the expressions described by the expression description sentences from the script sentence.

The degree of similarity may be measured using a cosine similarity method or an edit distance method.

The dividing of each of the collected documents may generate the script document and the description document on the basis of an identifier for identifying the beginning and end of each of the script portion and the description portion or sentences.

The method for processing documents may further include storing the extracted expressions and the expression description sentences that describe the extracted expressions.

The method for processing documents may further include providing, to a user, the extracted expressions and the expression description sentences that describe the extracted expressions in response to a request from the user.

According to another aspect of the present invention, there is provided a language education method including any one of the methods described above.

According to another aspect of the present invention, there is provided a computer-readable medium in which a program for executing any one of the methods described above is recorded in a computer.

BRIEF DESCRIPTION OF THE DRAWINGS

The above objects, and other features and advantages of the present invention will become more apparent after a reading of the following detailed description taken in conjunction with the drawings, in which:

FIG. 2 is a diagram showing documents that are collected by an apparatus for processing documents according to an embodiment of the present invention.

ADVANTAGEOUS EFFECTS

Figure 1:
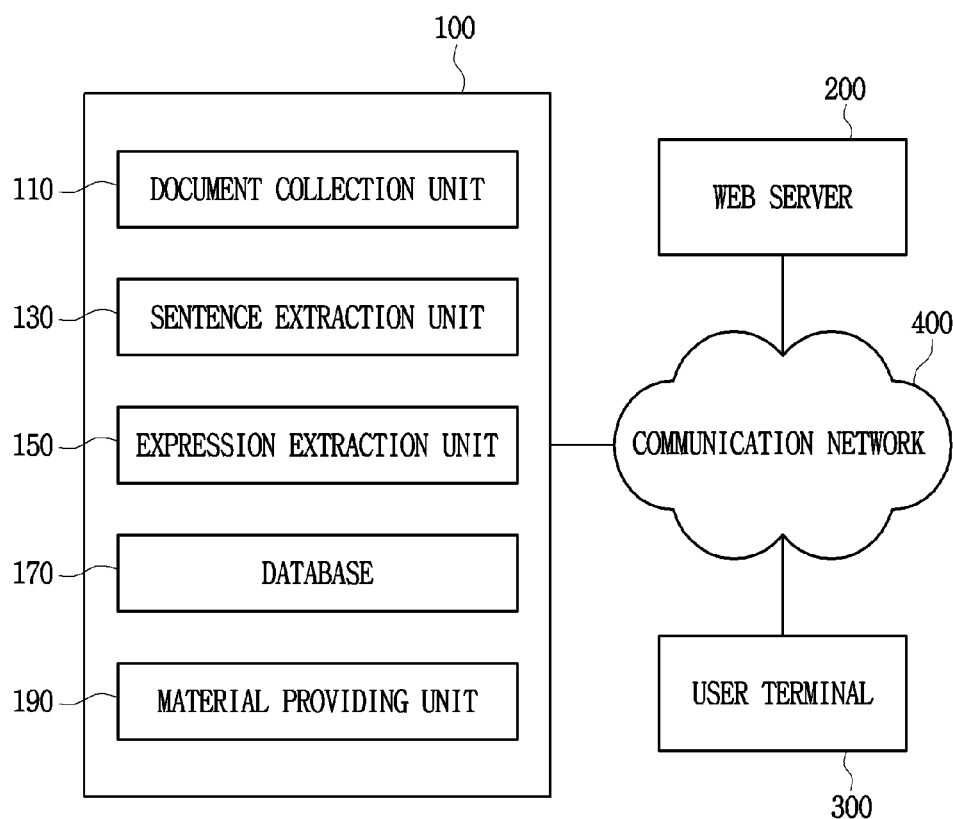
FIG. 1 is a block diagram showing an apparatus for processing documents according to an embodiment of the present invention.

As described above, according to the invention, study material that includes a pair, comprising an expression to be studied and a description thereof, may be automatically constructed. In addition, expressions used in an actual sentence are utilized as a study target, so that detailed descriptions as well as the usages of expressions may be provided in comparison with an English dictionary search result in which only dictionary meaning is presented, and descriptions are written in the same language as that of the expressions to be studied, so that meanings of the expressions may be accurately provided without misinterpretation of the original meanings.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

First, an apparatus for processing documents according to an embodiment of the present invention will be described in detail with reference to FIGS. 1 and 2.

FIG. 1 is a block diagram showing an apparatus for processing documents according to an embodiment of the present invention, and FIG. 2 is a diagram showing documents that are collected by an apparatus for processing documents according to an embodiment of the present invention.

Referring to FIG. 1, an apparatus 100 for processing documents according to an embodiment of the present invention is connected to a web server 200 and a user terminal 300 through a communication network 400. The document processing apparatus 100 automatically extracts expressions to be studied and descriptions thereof from documents that are collected through websites provided in the web server 200, and stores the extracted expressions and descriptions. In addition, the document processing apparatus 100 receives a query from the user terminal 300, and provides, to the user terminal 300, study material including the expression to be studied and the description thereof, which correspond to the query.

The web server 200 provides webpages in response to requests from the user terminal 300 and the document processing apparatus 100 through the communication network 400. The web server 200 may provide the webpages through language education sites, and the document processing apparatus 100 may extract a predetermined document from a variety of documents included in the webpages. For example, in the website "www.eslpod.com", a document including an English script and description thereof is provided. Hereinafter, it will be described that the document processing apparatus 100 performs work using a predetermined document extracted from the website "www.eslpod.com". Obviously, the invention is not limited to the website "www.eslpod.com", and the document processing apparatus 100 may extract documents required for the work from other websites.

As an example of the documents, referring to FIG. 2, a document (DC) provided from the website "www.eslpod.com" includes a script portion (SP) and a description portion (DP). A variety of stories are developed in the script portion (SP) of each document (DC), and the meanings or usages for expressions in the corresponding script portion (SP) are described in the description portion (DP). Here, the document (DC) is written in English; however, the invention is not limited thereto. Thus, the document (DC) may be written in other languages, such as Korean, Japanese, German, Chinese, or the like. The expression indicates a unit that transmits at least one meaning, and includes morphemes, words or idioms, and combinations thereof. Hereinafter, for the convenience of description, expressions written in English will be described, however, the invention is not limited thereto. In addition, both the script portion (SP) and the description portion (DP) are preferably written in the same language; however, they may be written in different languages.

The user terminal 300 is a communication terminal device which is used by a user to receive web services, and is connected to the web server 200, the document processing apparatus 100, or the like through the communication network 400 to thereby transmit and receive information. The user terminal 300 may be a terminal which includes a memory means and a microprocessor mounted therein to have arithmetic capability, such as a notebook computer, workstation, palmtop (palmtop) computer, UMPC (Ultra Mobile Personal Computer), tablet PC, PDA (Personal Digital assistant), web pad, or mobile phone, as well as a desktop computer.

The communication network 400 may include a telephone network and the like as well as a data communication network including a LAN (Local Area Network), a MAN (Metropolitan Area Network), a WAN (Wide Area Network), the Internet, and the like, and may use any communication method, regardless of whether it is wired or wireless.

The document processing apparatus 100 according to an embodiment of the invention will be described in more detail. Referring to FIG. 1, the document processing apparatus 100 includes a document collection unit 110, a sentence extraction unit 130, an expression extraction unit 150, a database 170, and a material providing unit 190.

The document collection unit 110 collects documents from websites provided in the web server 200. As described above, the document may be extracted from a predetermined web site such as "www.eslpod.com", and includes a script and a description thereof. Here, the script denotes a short story concerning a particular topic, and includes declarative sentences and conversational sentences.

In addition, the document collection unit 110 extracts a script portion and a description portion from the collected document based on an identifier for identifying the beginning and end of each of the script portion and the description portion or sentence to thereby generate a script document and a description document. For example, as shown in FIG. 2, the identifier "start of story" may denote the beginning of the script portion (SP), and the identifier "end of story" may denote the end of the script portion (SP) and the beginning of the description portion (DP). Beyond these examples, the identifiers may exist in a variety of forms, such as the specific symbols "*" or "✘", or the words "start" or "end". In addition, the identifier may identify the script portion and the description portion in the form of a sentence, such as "Let's go!" or "Thank you". It is preferable that the document has the above described specific form, so that the script portion and the description portion be easily extracted from the document, however, the invention is not limited thereto. The document extraction unit 130 separates each of script sentences from the script document based on identifiers, such as symbols indicating the end of the sentence, for example, a period, a question mark, an exclamation mark, and the like, and separates each of the description sentences from the description document. Thereafter, the sentence extraction unit 130 classifies the description sentences to determine which of the script sentences each of the description sentences corresponds to. To classify the description sentences, for example, a CRF (Conditional Random Field) may be used, however, the invention is not limited thereto. The CRF is a discriminative probabilistic model classifier used for labeling or parsing sequential data such as natural language text.

In this instance, with respect to an arbitrary i-th script sentence, the classified result is represented as a binary classification concerning whether each of the description sentences is a description of the i-th script sentence. More specifically, when the number of script sentences included in a single script document is M, each of the description sentences of the description document for the i-th script sentence is an input of the classifier, and binary classification results for all description sentences in the description document are output. When the above-described classification process is performed on all script sentences (1≤i≤M), the description sentence corresponding to each of the script sentences may be extracted, thereby classifying the description sentences in the description document to determine which of the script sentences in the script document each of the description sentences corresponds to. Hereinafter, the description sentence corresponding to a specific script sentence is referred to as the sentence description for the corresponding script sentence. Obviously, no description sentence corresponding to the specific script sentence may exist, and some description sentences may exist that do not correspond to the script sentence. The expression extraction unit 150 extracts an expression description sentence from the sentence description, and determines which expression in the corresponding script sentence the extracted expression description sentence describes, to thereby extract the determined result.

First, the expression extraction unit 150 may perform binary classification concerning whether each sentence has the form of a description of an English expression with respect to all of the sentences in all of the extracted sentence descriptions. For this, a labeled sequential pattern (LSP) method may be used, however, the invention is not limited thereto. The LSP method is a method of patterning a predetermined sentence to express the patterned sentence. That is, the LSP method is a method of substituting general words with markers that indicate classes having wide ranges, such as substituting "where can I find a job" with "where can PRN VB DT NN?". Here, PRN represents "pronoun", VB represents "verb", DT represents "article", and NN represents "noun".

A pattern which indicates the description type of an English expression may be taught using a document that includes a script portion and a description portion. For example, " . . . means to . . . " or " . . . is a . . . " which are frequently used expressions when describing English expressions, is taught using the pattern. Binary classification is performed on each sentence of all of the sentence descriptions in accordance with the pattern, so that expression description sentences that indicate English expressions may be extracted.

Next, the expression extraction unit 150 extracts English expressions within the script sentence that is described by the extracted expression description sentence. As the degree of similarity between the expressions within the script sentence and the expression description sentence increases, the probability that the expression description sentence is a description of the corresponding English expression increases. Accordingly, the expression extraction unit 150 extracts an English expression which is described by the expression description sentence based on the degree of similarity between the expressions in the script sentence and the expression description sentence. The degree of similarity may be used to compare documents when text mining, and may be determined using a cosine similarity method of measuring the degree of similarity between pieces of text, or an edit distance method of measuring the distance between character strings; however, the invention is not limited thereto.

The expression extraction unit 150 extracts the corresponding English expressions with respect to all of the expression description sentences using the above-described methods, and stores the extracted English expressions and the expression description sentences that describe the extracted English expressions in the database 170. In this instance, the expression extraction unit 150 may store, in the database 170, a pair (hereinafter, referred to as an "expression-description pair") comprising an English expression and an expression description sentence that describes the English expression.

The database 170 stores the expression-description pair provided from the expression extraction unit 150, and provides the expression-description pair in response to a request from the material providing unit 190.

The material providing unit 190 performs an indexing operation on the expression-description pair to allow information in the database 170 to be easily retrieved. In addition, when receiving a query from the user terminal 300, the material providing unit 190 is subjected to a pre-treatment process, such as extracting the most appropriate expression for the query through analysis or the like, retrieves the expression-description pair including the corresponding expression from the database 170, and then provides the retrieved expression-description pair to the user terminal 300.

In this manner, the document processing apparatus 100 according to an embodiment of the invention may study material including the English expression and the description thereof as a pair from the websites to thus automatically construct study material. The study material may be used to automatically construct a word dictionary and a phrase dictionary, and may be utilized as educational material in any form of software for foreign language education.

In addition, when a user requires a description of an English expression of which the user is not substantially aware, or with which the user is not familiar, the document processing apparatus 100 according to an embodiment of the invention may retrieve an appropriate pair of an English expression and a description sentence through the database to thereby present the retrieved result.

Consequently, by presenting the English expression and the description thereof using a web document, a detailed description as well as the usage of an expression may be actually provided within the script, in comparison with an English dictionary search result for a description presented in Korean, which includes only the dictionary meaning, and the original meaning may be provided due to a description sentence which is also presented in English, without misinterpretation of the original meaning.

The document processing apparatus 100 according to an embodiment of the invention may be used to collect pairs of expressions and descriptions for language education, and thereby may be included in a variety of systems (not shown) for such language education. As an example of the variety of systems, an online dictionary system or an interactive education system may be given, however, the invention is not limited thereto.

Meanwhile, the document processing apparatus 100 according to an embodiment of the invention may be implemented without at least one of the database 170 and the material providing unit 190. In this case, the database 170 and/or the material providing unit 190 may be included in a foreign language education system, such as an English dialogue system or the like. The document processing apparatus 100 may be implemented as an independent server, however, it may alternatively be implemented to be integrated with the user terminal 300. That is, all functions of the document processing apparatus 100 may be implemented in the user terminal 300, so that the user terminal 300 may collect web documents and extract pairs of expressions and descriptions from the collected web documents, and the pairs of expressions and descriptions may be retrieved in response to a user's request to be provided to the user. Obviously, some of the functions of the document processing apparatus 100 may be implemented in the user terminal 300.

A method for processing documents (hereinafter, referred to as a "document processing method") will be described with reference to FIG. 3.

Figure 3:
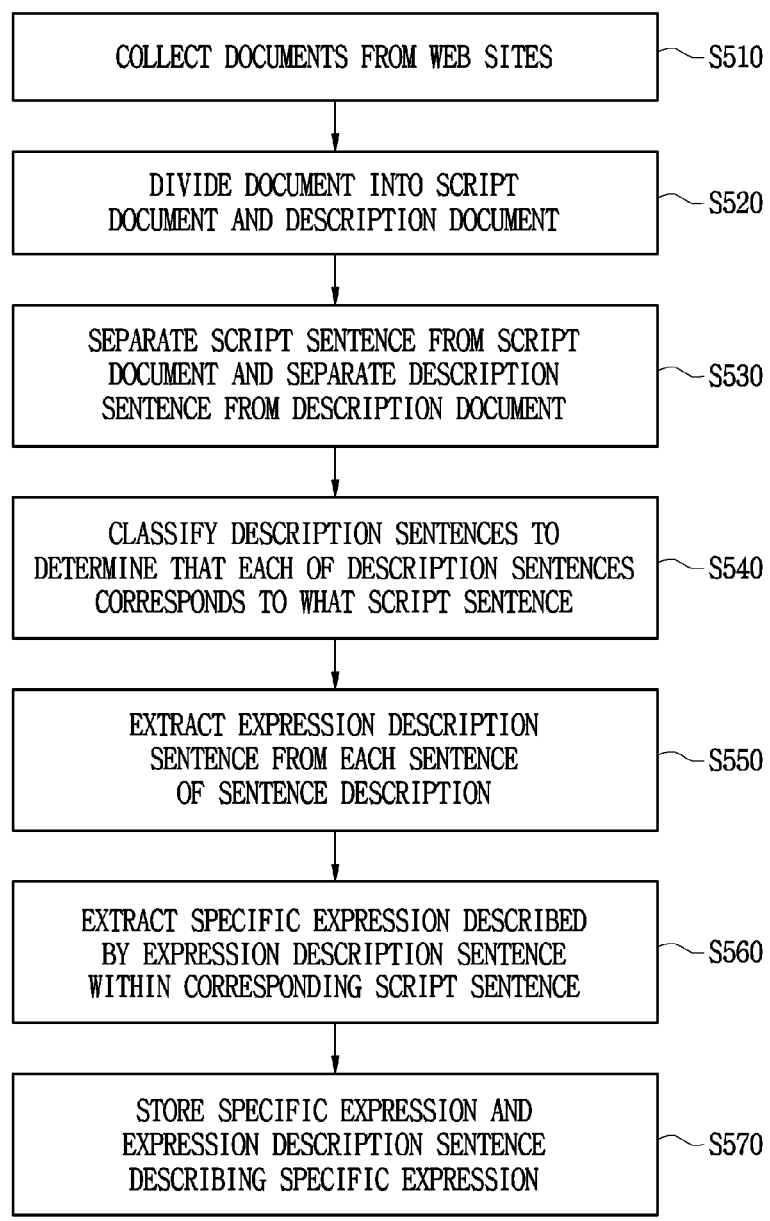
FIG. 3 is a flowchart showing a method for processing documents according to an embodiment.

FIG. 3 is a flowchart showing a document processing method according to an embodiment.

First, in step S510, the document processing apparatus 100 collects documents, including a script and a description thereof, from web sites provided in the web server 200. Next, at step S520, the document processing apparatus 100 extracts a script portion and a description portion from the collected documents based on an identifier that indicates the beginning and end of each of the script portion and the description portion or sentences, to thereby generate a script document and a description document, respectively.

In step S530, the document extraction unit 130 separates each of script sentences from the script document based on an identifier such as a symbol or the like, which indicates the end of the sentence, for example, a period, a question mark, an exclamation mark, or the like, and separates each of the description sentences from the description document. Next, in step S540, the document processing apparatus 100 classifies the description sentences to determine which of the script sentences each of the description sentences corresponds to, using a CRF classifier or the like.

Next, in step S550, the document processing apparatus 100 performs binary classification concerning whether each sentence has the form of a description of an English expression with respect to all sentences of the extracted sentence descriptions, using an LSP method or the like, and extracts the expression description sentence having the type of the description of the English expression.

Next, in step S560, the document processing apparatus 100 extracts English expressions which are described by the extracted expression description sentences from the corresponding script sentence. In this instance, the document processing apparatus 100 measures the degree of similarity between the extracted expression description sentence and the expressions within the corresponding script sentences using a cosine similarity method, an edit distance method, or the like, to thereby extract English expressions described by the corresponding expression description sentence.

Next, in step S570, the document processing apparatus 100 stores the extracted English expressions and expression description sentences that describe the extracted English expressions. In this instance, the document processing apparatus 100 may store a pair comprising the English expression and the expression description sentence that describes the English expression as a single document.

The document processing apparatus 100 performs a pretreatment process, such as receiving a query from the user terminal 300 to analyze the received query and extracting the most appropriate expression for the query, retrieves a document including the corresponding expression from the database 170, and transmits the retrieved result to the user terminal 300.

The document processing method according to an embodiment of the invention may be used to collect pairs, each comprising an expression for language education and a description thereof, to thereby be included in a variety of methods for language education. As an example of the variety of methods, an online dictionary providing method or an interactive education method may be given, however, the invention is not limited thereto.

The embodiments of the invention may include computer-readable media including program instructions for implementing various operations using a computer. A program for performing the above described document processing method may be recorded on the media. The media may also include, alone or in combination with the program instructions, data files, data structures, and the like.

Examples of computer-readable media include magnetic media such as hard disks, floppy disks, and magnetic tape; optical media such as CD ROM disks and DVDs; magneto-optical media such as optical disks; and hardware devices that are specially configured to store and execute program instructions, such as read-only memory (ROM), random access memory (RAM), flash memory, and the like. The media may be transmission media such as a metal wire, a waveguide, or light including a sub-carrier transmitting a signal designating program instructions, data structures, etc. Examples of program instructions include both machine code, such as that produced by a compiler, and files containing higher level code, which may be executed by the computer using an interpreter.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. An apparatus for processing documents, comprising:
   a processor; and
   a memory comprising code that, when executed by the processor, causes the processor to:

collect documents from websites, and divide each of the collected documents into a script portion and a description portion to generate a script document and a description document;

separate sentences from the script document to extract a plurality of script sentences, and separate sentences from the description document to extract a plurality of description sentences; and extract expression description sentences from the plurality of description sentences, and extract expressions described by the expression description sentences from the plurality of script sentences, wherein the expression description sentences comprise idiom description sentences, and the expressions comprise idioms corresponding to the idiom description sentences, and wherein the processor extracts the idiom description sentences from the plurality of description sentences by using a labeled sequential pattern that indicates a description of an idiom.

2. The apparatus for processing documents according to claim 1, wherein the code, when executed by the processor, causes the processor to:

classify the description sentences to determine which script sentence, from among the plurality of script sentences, each of the description sentences corresponds to.

3. The apparatus for processing documents according to claim 2, wherein the code, when executed by the processor, causes the processor to:

classify the description sentences using a conditional random field classifier.

4. The apparatus for processing documents according to claim 1, wherein the code, when executed by the processor, causes the processor to:

measure a degree of similarity between the idioms in the idiom description sentences and the idioms in the script sentences.

5. The apparatus for processing documents according to claim 4, wherein the degree of similarity is measured using a cosine similarity method or an edit distance method.

6. The apparatus for processing documents according to claim 1, wherein the code, when executed by the processor, causes the processor to:

generate the script document and the description document on a basis of an identifier for identifying a beginning and end of each of the script portion and the description portion or sentences.

7. The apparatus for processing documents according to claim 1, further comprising:

a database configured to store the extracted idioms and the idiom description sentences that describe the extracted idioms.

8. The apparatus for processing documents according to claim 1, wherein the code, when executed by the processor, causes the processor to:

provide, to a user, the extracted idioms and the idiom description sentences that describe the extracted idioms in response to a request from the user.

9. The apparatus for processing documents according to claim 1, wherein the document is written in English.

10. A language education system comprising the apparatus for processing documents according to claim 1.

11. A method for processing documents, comprising:

collecting documents from websites, and dividing each of the collected documents into a script portion and a description portion to generate a script document and a description document;

separating sentences from the script document to extract a plurality of script sentences, and separating sentences from the description document to extract a plurality of description sentences; and extracting, by a processor, expression description sentences from the plurality of description sentences, and extracting expressions described by the expression description sentences from the plurality of script sentences, wherein the expression description sentences comprise idiom description sentences, and the expressions comprise idioms corresponding to the idiom description sentences, and wherein the extracting the expression description sentences comprises extracting the idiom description sentences from the plurality of description sentences by using a labeled sequential pattern that indicates a description of an idiom.

12. The method for processing documents according to claim 11, wherein the extracting the sentences comprises classifying the description sentences to determine which script sentence, from among the plurality of script sentences, each of the description sentences corresponds to.

13. The method for processing documents according to claim 12, wherein the classifying the description sentences comprises classifying the description sentences using a conditional random field classifier.

14. The method for processing documents according to claim 11, wherein the extracting the expressions comprises measuring a degree of similarity between the idioms in the idiom description sentences and the idioms in the script sentences.

15. The method for processing documents according to claim 14, wherein the degree of similarity is measured using a cosine similarity method or an edit distance method.

16. The method for processing documents according to claim 11, wherein the dividing each of the collected documents comprises generating the script document and the description document on a basis of an identifier for identifying a beginning and end of each of the script portion and the description portion or sentences.

17. The method for processing documents according to claim 11, further comprising:

storing the extracted idioms and the idiom description sentences describing the extracted idioms.

18. The method for processing documents according to claim 11, further comprising:

providing, to a user, the extracted idioms and the idiom description sentences describing the extracted idioms in response to a request from the user.

19. The method for processing documents according to claim 11, wherein the document is written in English.

20. A language education method comprising the method for processing documents according to claim 11.

21. A non-transitory computer-readable medium comprising code that, when executed by the processor, causes the processor to perform the method according to claim 11.

* * * * *